May 13, 1930.  G. MEYER  1,758,083
GAS METER
Filed Jan. 6, 1927
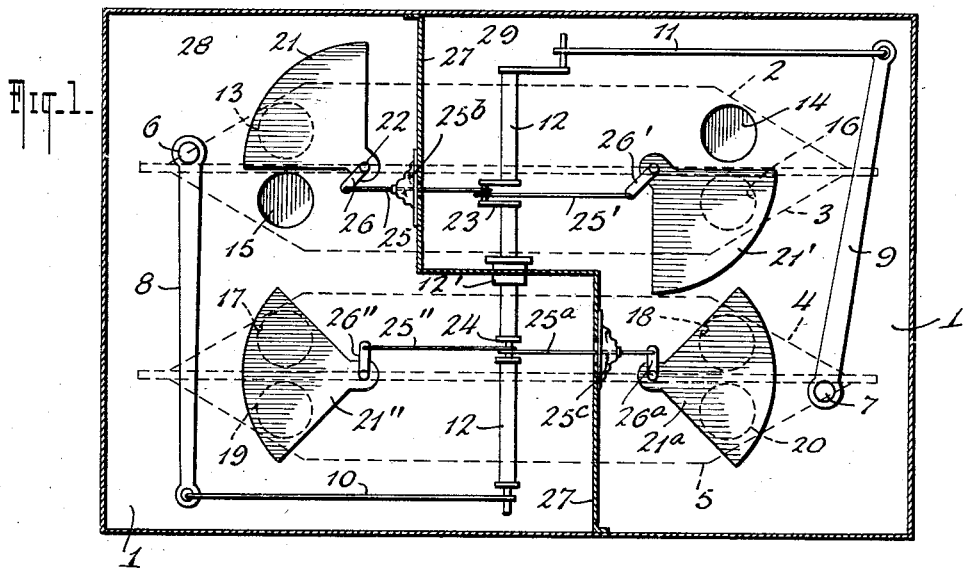
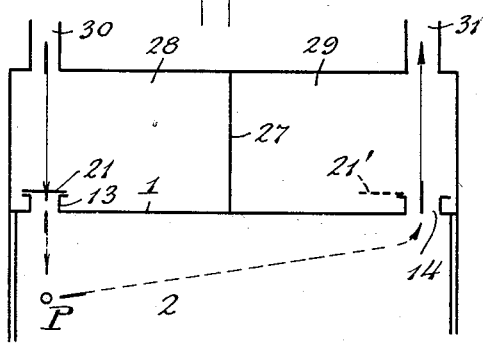
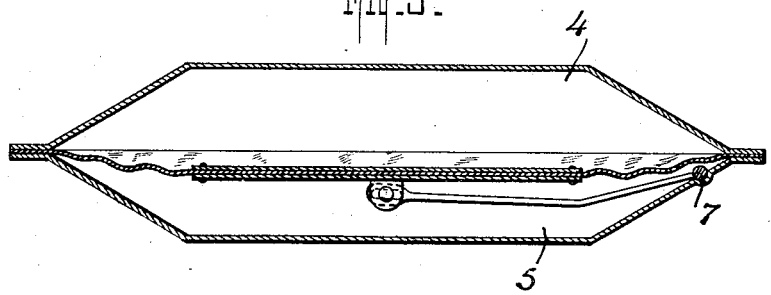
INVENTOR
GEORG MEYER
BY
Lotka, Kehlenbeck & Farley
ATTORNEYS Patented May 13, 1930

1,758,083

UNITED STATES PATENT OFFICE

GEORG MEYER, OF MAINZ, GERMANY, ASSIGNOR TO GASMESSERFABRIK MAINZ ELSTER & CO., OF MAINZ, GERMANY

GAS METER

Application filed January 6, 1927, Serial No. 159,399½, and in Germany January 7, 1926.

My invention relates to devices for measuring or metering gas, and particularly to those of the type known as dry gas meters. The object of my invention is to improve the efficiency of such apparatus, chiefly by reducing internal resistance to the gas flow, which result I accomplish partly by a novel construction enabling me to dispense with certain structural elements employed hitherto, and partly by a valve arrangement which not only shortens the path of the gas, as compared with the customary arrangement, but avoids the detrimental reversals in the direction of the gas current which occur in certain prevailing constructions of this type.

The invention will now be described in detail with reference to the accompanying drawings, in which Fig. 1 is a plan view of a typical and satisfactory example of a gas meter embodying my present invention, with the cover removed; Fig. 2 is a diagrammatic vertical section of said gas meter, the relative arrangement of the parts having been altered somewhat from that shown in Fig. 1; and Fig. 3 is a sectional view illustrating one pair of measuring chambers.

An example of my improved construction by which pressure losses are reduced is shown in Figs. 1 and 2. The registering mechanism proper, which may be of any customary or approved character, has been omitted from the drawings, as have the bearings of the valve controlling shaft and some other parts the details of which form no part of my present invention.

The casing of the gas meter illustrated is provided with the usual horizontal partition 1 separating the measuring chambers from the inlet and outlet chambers referred to below. Four measuring chambers 2, 3, 4, 5 respectively have been indicated, each of them containing a movable wall or diaphragm of well-known type, which moves alternately in opposite directions as the gas flows into, or out of, the measuring chamber, and the movement of such wall or diaphragm is transmitted by suitable connections to an upright rock shaft 6 or 7 respectively, there being one such shaft for each pair of measuring chambers 2, 3, or 4, 5 respectively. On said rock shafts are secured arms 8, 9 respectively, connected by rods 10, 11 respectively with cranks on the valve controlling shaft 12, said cranks being at 90° to each other. The measuring chamber 2 has two ports 13 and 14 respectively, one of which serves as an inlet and the other as an outlet. Similarly, the chamber 3 has a pair of ports 15 and 16, while the chamber 4 has ports 17 and 18, and the chamber 5 two ports 19 and 20 respectively, instead of employing a single port both as inlet and as outlet, as in prior constructions of gas meters of the type in question.

The chambers are arranged in pairs and corresponding ports of the same pair are controlled by the same valve. For instance, the inlet ports 13 and 15 are adjacent to each other and controlled by the same valve, herein shown as a sector shaped plate 21 mounted to rock about an upright axis 22. The width of said plate and the relative arrangement of the ports 13, 15 are such that in a certain position of the valve plate 21 (position shown in Fig. 1) said valve will close only one of the ports, as the port 13, while in other positions the said valve plate 21 may close either both ports 13 and 15, or only the port 15. It will be noted that this valve plate 21 and the similar plates 21', 21'' and 21ᵃ which control the other adjacent ports of the measuring chambers, are flat and do not have any recesses or cavities such as are present in the corresponding valves of prior constructions. The valve controlling shaft 12 has two cranks 23 and 24 arranged at 90° from each other, and by means of rods 25, 25', 25'' and 25ᵃ these cranks are connected with arms 26, 26', 26'' and 26ᵃ respectively, on the shafts of the several valves, the crank 23 being thus operatively related to the valves 21 and 21', while the crank 24 cooperates with the valves 21'' and 21ᵃ. The connection of the valves is such that, as regards two adjacent chambers, as 2, 3 or 4, 5, only diagonally opposite parts will be open at the same time, that is to say, the inlet of one chamber and the outlet of the other chamber of the same pair. Thus Fig. 1 shows the valves 21, 21' in such a position as to open the inlet port 15 of the chamber 3 and the outlet port 14 of the chamber 2. The valves must never take a position in which the inlet port will be open at the same time as the outlet port of the same chamber. For a moment, as the valves pass from one end position, such as shown at the upper half of Fig. 1, to the opposite end position, all four ports of a pair of measuring chambers will be closed at the same time, this momentary intermediate position being shown for the valves 21″, 21$^a$ at the lower portion of Fig. 1. The space between the top of the casing and the partition 1 is subdivided by means of a partition 27 into two compartments 28, 29, respectively, one of which connects with the inlet pipe or conduit 30, while the other communicates with the outlet pipe or conduit 31. It will be understood that the ports 13, 15, 17, and 19 lead into the compartment 28 while the ports 14, 16, 18, and 20 lead into the compartment 29. The partition 27 is shown as having two parallel end portions and a central connecting portion in which the shaft 12 is journaled at 12′ with the aid of a stuffing box of gas tight character. The connecting rods 25 and 25$^a$ extend through suitable openings in said partition 27 and are each connected with a flexible gas tight member such as 25$^b$, 25$^c$, made of leather or other suitable material which gives the rods sufficient freedom for their motion and yet preserves a gas tight separation between the compartments 28 and 29.

The gas entering through the inlet conduit 30 into the compartment 28 will, if the valves are in the position illustrated in Fig. 1, pass through the port 15 into the chamber 3. The movable wall or diaphragm of said chamber will be forced to one side into the chamber 2, thus expelling the gas contained in said chamber, through the port 14 into the compartment 29 and out through the conduit 31. The movement of the diaphragm will also rock the shaft 6 in the well-known manner, and through the medium of the arm 8, rod 10 and the corresponding crank on the shaft 12, impart a partial rotation to the latter. Such partial rotation will, by means of the cranks 23, 24 and the rods cooperating therewith, reverse the position of the valves 21 and 21′ so that the ports 14 and 15 will be closed, while the ports 13 and 16 will be opened. The gas will now pass from the compartment 28 into the chamber 2 through the port 13, and be expelled from the chamber 3 into the compartment 29 through the port 16. The valves 21″ and 21$^a$ will be operated simultaneously in a similar manner, and the shaft 12 will receive a practically continuous rotation. This rotation is utilized in any well-known or approved manner for the operation of a counting or registering train which I have not deemed it necessary to illustrate.

A consideration of Fig. 2 will make it clear that my improved arrangement is far superior to the one previously employed. It will be noted that in my construction there is no reversal in the direction of the gas flow such as occurs in the recesesd valves of prior constructions. This reversal of flow and also the reduction in the cross section of the gas passage at this point, are detrimental by throttling the gas passage and producing a pressure loss, especially as the reversal takes place in a confined space with a small radius of curvature. In my construction none of the valves causes a reversal of the gas flow at the valve, but such valves simply open and close. The change in the gas flow into and out of the respective measuring chambers is effected by the cooperation of the individual valves 21, 21′ or 21″ and 21$^a$, respectively. Another source of pressure loss in prior constructions is found in the outlet pipes which cause a whirling of the gas stream and also a throttling action, both of which in conjunction with the friction along the walls of the outlet pipe, cause a further pressure loss. While this loss has been reduced somewhat in existing constructions by making the outlet pipe as short and of as large a diameter as the dimensions as the apparatus will permit, still some loss remains whenever an outlet pipe such as is referred to above is interposed between the valve and the outlet connection. It will be seen, however, that in my construction an outlet pipe such as mentioned hereinbefore is dispensed with altogether, each measuring chamber opening directly into the compartments 28 and 29 located above such chamber so that the full area of said compartments is available for the passage of the gas from or to the ports at the top of the measuring chambers. The resistance to the gas flow is thus reduced to a minimum and the pressure loss is correspondingly low.

Another advantage resulting from my improved construction is the material shortening of the path which the gas takes from the inlet 30 to the outlet 31. This is due not only to the omission of the aforesaid outlet pipe, but to the efficient location of the inlet ports 13, 15, 17, and 19 relatively to the conduit 30, and of the outlet ports 14, 16, 18 and 20 relatively to the outlet conduit 31. Of course, the path of the gas within a measuring chamber is substantially of the same length in my construction as in the prior one, but a much more direct path is provided by my construction from the inlet conduit 30 to the measuring chambers and from the outlet ports of the measuring chambers to the outlet conduit 31. The arrows drawn in solid lines in Fig. 2 indicate the path of the gases exteriorly of the measuring chambers and show clearly that this portion of the gas path is much shorter in my construction than in the one employed hitherto. This advantage is largely a consequence of the fact that my construction has two ports, the gas entering at one port and leaving at the other, whereas in the prior construction the gas had to leave through the same port through which it had previously entered. Furthermore, the two ports of the same measuring chamber are in my construction spaced so far apart as to reduce their distance from the inlet conduit 30 and the outlet conduit 31, respectively. The reduction in the length of the gas path will become especially convincing if we consider the path of a particular portion or particle of the gas such as the one indicated at P in Fig. 2. The dotted arrows indicate the path of said particle within the measuring chamber so that the entire path is indicated by the aggregate length of the dotted arrows and the arrows shown in full lines. While the path within the measuring chamber is approximately of the same length in the present case as in existing constructions, a reversal of direction is required in the known construction, while in my improved construction illustrated by Fig. 2 there is no reversal in the path of the gas particle P but only a deflection from its straight course, and after entering the measuring chamber, such gas particle proceeds in a substantially straight line to the outlet of said chamber.

It will be understood that various modifications may be made without departing from the nature of my invention as set forth in the appended claims. More particularly the arrangement of the partition 27 may be varied and other mechanisms than the one illustrated may be employed for operating the valves 21, 21', 21'' and 21ª; nor is it essential to my invention that such valves should be rocking sectors, since other forms of valves might be employed to control the ports of the measuring chambers in substantially the manner described herein.

I claim:

1. A gas meter comprising a casing forming an inlet compartment and an outlet compartment, a plurality of pairs of measuring chambers each of which chambers has a port by which it may communicate with said inlet compartment and another port by which it may communicate with said outlet compartment, a plurality of valves each of which controls the two inlet ports leading from said inlet compartment to the measuring chambers of the same pair, other valves each of which controls the two outlet ports leading to the outlet compartment from the measuring chambers of the same pair, an operative connection between the two valves controlling the communication of chambers of the same pair with the inlet compartment and the outlet compartment respectively, in such a manner that only one port of each pair of inflow and outflow ports can be open at a time, and an operative connection between valves belonging to different pairs of measuring chambers, to cause such pairs of chambers to operate out of phase with each other.

2. A gas meter comprising a casing forming a pair of measuring chambers each provided with separate ports for the inflow and outflow of gas, the inlet ports of the two chambers being adjacent to each other and the outlet ports of the two chambers being likewise adjacent to each other, a valve controlling the inlet ports of both chambers, another valve controlling the outlet ports of both chambers, and an operative connection between said valves, so arranged that the inlet port of one chamber will be open at the same time as the outlet port of the other chamber, and vice-versa.

3. A gas meter comprising a casing forming an inlet compartment, an outlet compartment, and a pair of measuring chambers having adjacent inlet ports adapted for connection with one of said compartments, and adjacent outlet ports, separate from said inlet ports and adapted for connection with the other compartment, a valve controlling the inlet ports of both chambers, another valve controlling the outlet ports of both chambers, and an operative connection between said valves, so arranged that the inlet port of one chamber will be open at the same time as the outlet port of the other chamber, and vice-versa.

4. A gas meter according to claim 2, in which the valves consist of flat plate-like members movable across the ports of the measuring chambers.

5. A gas meter according to claim 2, in which the valves consist of sector plates having flat surfaces controlling the ports of the measuring chambers, said plates being pivoted about axes which lie exteriorly of the ports controlled by the respective valves.

In testimony whereof I have hereunto set my hand.

GEORG MEYER.